United States Patent
Li (10) Patent No.: US 10,922,102 B2
(45) Date of Patent: Feb. 16, 2021

(54) METHOD OF CONTROLLING APPLICATIONS IN A TERMINAL AND TERMINAL

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/510,602

(22) Filed: Jul. 12, 2019

(65) Prior Publication Data
US 2020/0019416 A1 Jan. 16, 2020

(30) Foreign Application Priority Data
Jul. 13, 2018 (CN) .......................... 2018 1 0775702

(51) Int. Cl.
G06F 9/451 (2018.01)
G06F 3/01 (2006.01)
G06F 3/16 (2006.01)
G06F 9/445 (2018.01)

(52) U.S. Cl.
CPC .............. G06F 9/451 (2018.02); G06F 3/017 (2013.01); G06F 3/167 (2013.01); G06F 9/44505 (2013.01)

(58) Field of Classification Search
CPC ..................................................... G06F 9/451
USPC ....................................................... 715/863
See application file for complete search history.

(56) References Cited

U.S. PATENT DOCUMENTS

| 9,836,192 | B2* | 12/2017 | Katsuranis | ............ G06F 3/0484 |
| 2012/0110496 | A1* | 5/2012 | Lee | ................... H04M 1/72522 |
| | | | | 715/778 |
| 2013/0120294 | A1* | 5/2013 | Sun | ......................... G06F 9/451 |
| | | | | 345/173 |
| 2015/0243288 | A1* | 8/2015 | Katsuranis | .............. G06F 3/167 |
| | | | | 704/275 |
| 2016/0034253 | A1* | 2/2016 | Bang | ....................... G06F 9/451 |
| | | | | 715/728 |
| 2017/0192526 | A1* | 7/2017 | Rosnow | ................ G06F 3/0227 |
| 2017/0308389 | A1* | 10/2017 | Ducatelle | ................ G10L 15/22 |
| 2017/0371509 | A1* | 12/2017 | Jung | ..................... G06F 3/0482 |
| 2018/0024845 | A1* | 1/2018 | Card, II | ................ G06F 3/0304 |
| | | | | 715/719 |
| 2018/0129518 | A1* | 5/2018 | Lee | ........................ A61B 3/066 |
| 2018/0364885 | A1* | 12/2018 | Melencio | ................ G06F 3/015 |

(Continued)

FOREIGN PATENT DOCUMENTS

CN 106098061 A 11/2016

*Primary Examiner* — William D Titcomb
(74) *Attorney, Agent, or Firm* — McDermott Will & Emery LLP (57) ABSTRACT

Disclosed are a method of controlling applications in a terminal and a terminal, which may extend the control methods of the applications installed in the terminal. The method includes: receiving a user operation instruction including a voice instruction or a gesture instruction that is not in contact with the terminal, during a display of a first operation interface of a first application by the terminal; determining a first control corresponding to the user operation instruction from at least one control on the first operation interface; and executing a response program of the first control.

14 Claims, 3 Drawing Sheets

```
┌─────────────────────────────────────────────────────────────┐
│ Displaying setting information of applications, and the setting │
│ information is configured to indicate whether configuration files of the │
│        applications are included in the database           │
└─────────────────────────────────────────────────────────────┘
         │                                      │
         ▼                                      ▼
┌──────────────────────────────┐  ┌──────────────────────────────┐
│ If setting information of any│  │ If setting information of any│
│ application indicates that a │  │ application indicates that a │
│ configuration file of the    │  │ configuration file of the    │
│ application is included in   │  │ application is not included  │
│ the database, receiving a    │  │ in the database, receiving a │
│ first setting instruction    │  │ second setting instruction   │
│ directed at the application, │  │ directed at the application, │
│ and deleting the configuration│  │ and adding the configuration │
│ file of the application from │  │ file of the application into │
│ the database according to the│  │ the database according to the│
│ first setting instruction    │  │ second setting instruction   │
└──────────────────────────────┘  └──────────────────────────────┘
```

(56) References Cited

U.S. PATENT DOCUMENTS

2019/0004673 A1* 1/2019 Jang .................. G06F 3/0488
2019/0179608 A1* 6/2019 Kothari ............... G06F 9/453

* cited by examiner

METHOD OF CONTROLLING APPLICATIONS IN A TERMINAL AND TERMINAL

CROSS-REFERENCE TO RELATED APPLICATION

This application claims priority to Chinese Patent Application No. 201810775702.5, filed with the Chinese Patent Office on Jul. 13, 2018, titled "METHOD OF CONTROLLING APPLICATIONS AND TERMINAL", which is incorporated herein by reference in its entirety.

TECHNICAL FIELD

The present disclosure relates to the field of application control, and in particular, to a method of controlling applications in a terminal and a terminal.

BACKGROUND

An intelligent interaction, especially an intelligent voice interaction, is a new-generation interactive mode based on a voice input. In recent years, the intelligent voice interaction has been increasingly applied to computers, mobile phones, PADs, smart TVs, intelligent navigations, intelligent homes and other aspects.

SUMMARY

In a first aspect, a method of controlling applications in a terminal is provided. The method includes: receiving a user operation instruction during a display of a first operation interface of a first application by the terminal, wherein the user operation instruction includes a voice instruction or a gesture instruction that is not in contact with the terminal; determining a first control corresponding to the user operation instruction from at least one control on the first operation interface; and executing a response program of the first control.

In some embodiments, determining the first control corresponding to the user operation instruction from the at least one control on the first operation interface, includes: obtaining a first control instruction corresponding to both the first operation interface and the user operation instruction from a database; and obtaining identification information of the first control corresponding to the first control instruction from the database.

In some embodiments, the first application has at least one operation interface including the first operation interface, and the database stores a configuration file of the first application. The configuration file includes a correspondence between identification information of each operation interface and at least one corresponding control instruction. At least one corresponding control instruction of the first operation interface includes the first control instruction. Obtaining the first control instruction corresponding to both the first operation interface and the user operation instruction from the database, includes: obtaining a control instruction corresponding to the user operation instruction from the database according to the user operation instruction; determining, according to identification information of the first operation interface and the correspondence between the identification information of each operation interface and the at least one corresponding control instruction, at least one control instruction corresponding to the identification information of the first operation interface; and determining whether the control instruction corresponding to the user operation instruction is included in the at least one control instruction; determining the control instruction to be the first control instruction corresponding to both the first operation interface and the user operation instruction if the control instruction is included in the at least one control instruction; and sending a message to cause a user to re-input the user operation instruction if the control instruction is not included in the at least one control instruction.

In some embodiments, the configuration file further includes identification information of the at least one operation interface of the first application. Before determining, according to the identification information of the first operation interface and the correspondence between the identification information of each operation interface and the at least one corresponding control instruction, the at least one control instruction corresponding to the identification information of the first operation interface, the method further includes: receiving, by using an adaptive management application, first identification information sent by the first application; and determining, by using an adaptive management application, that the first identification information is the identification information of the first operation interface according to the identification information of the at least one operation interface of the first application.

In some embodiments, the database stores a configuration file of the first application. The first application has at least one operation interface including the first operation interface. The configuration file includes identification information of each operation interface, and a correspondence between identification information of at least one control on each operation interface and at least one corresponding control instruction. Obtaining the identification information of the first control corresponding to the first control instruction from the database, includes: searching, by using an adaptive management application, for the identification information of the first control corresponding to the first control instruction from the database, according to identification information of the first operation interface, the first control instruction, and the correspondence between the identification information of the at least one control on each operation interface and the at least one corresponding control instruction.

In some embodiments, after the identification information of the first control corresponding to the first control instruction is searched, the method further includes: transmitting, by using the adaptive management application, the identification information of the first control to a framework layer of the terminal, so that the framework layer obtains the identification information of the first control.

In some embodiments, the framework layer includes a Service having an interface for adding interactive events and an interface for reading interactive events, an Input Manager Service and a DecorView. Transmitting, by using the adaptive management application, the identification information of the first control to the framework layer of the terminal, so that the framework layer obtains the identification information of the first control, includes: calling, by using the adaptive management application, the interface for adding interactive events of the Service to store the identification information of the first control, and sending, by using the Input Manager Service, a key value; and calling, by using the DecorView, the interface for reading interactive events of the Service to read the identification information of the first control after determining that the key value is received.

In some embodiments, the method further includes: displaying setting information of applications installed in the terminal, wherein the setting information is configured to indicate whether configuration files of the applications are included in the database; if setting information of any application indicates that a configuration file of the application is included in the database, receiving a first setting instruction directed at the application, and deleting the configuration file of the application from the database according to the first setting instruction; and if setting information of any application indicates that a configuration file of the application is not included in the database, receiving a second setting instruction directed at the application, and adding the configuration file of the application into the database according to the second setting instruction.

In some embodiments, displaying the setting information of the applications, includes: determining applications installed in the terminal; determining applications having configuration files stored in the database; and displaying setting information of applications installed in the terminal and having configuration files according to the applications installed in the terminal and the applications having configuration files stored in the database.

In some embodiments, the method further includes: deleting a configuration file of at least one application that is not installed in the terminal from the database.

In some embodiments, the method further includes: determining whether the first application belongs to a preset set of applications; and performing the step of determining the first control corresponding to the user operation instruction from the at least one control on the first operation interface if the first application belongs to the preset set of applications.

In a second aspect, a terminal is provided. The terminal includes a display, a receiver and a processor. The display is configured to display a first operation interface of a first application. The receiver is configured to receive a user operation instruction during a display of the first operation interface of the first application. The user operation instruction includes a voice instruction or a gesture instruction that is not in contact with the terminal. The processor is configured to determine a first control corresponding to the user operation instruction from at least one control on the first operation interface and execute a response program of the first control.

In some embodiments, the processor is configured to obtain a first control instruction corresponding to both the first operation interface and the user operation instruction from a database, and obtain identification information of the first control corresponding to the first control instruction from the database.

In some embodiments, the terminal further includes a memory coupled to the processor. The first application has at least one operation interface including the first operation interface. The memory is configured to store a configuration file of the first application. The configuration file includes a correspondence between identification information of each operation interface and at least one corresponding control instruction. At least one corresponding control instruction of the first operation interface includes the first control instruction. The processor is configured to: obtain a control instruction corresponding to the user operation instruction from the database according to the user operation instruction; determine, according to the identification information of the first operation interface and the correspondence between the identification information of each operation interface and the at least one corresponding control instruction, at least one control instruction corresponding to the identification information of the first operation interface; determine whether the control instruction corresponding to the user operation instruction is included in the at least one control instruction; determine the control instruction to be the first control instruction corresponding to both the first operation interface and the user operation instruction if the control instruction is included in the at least one control instruction; and send a message to cause a user to re-input the user operation instruction if the control instruction is not included in the at least one control instruction.

In some embodiments, the configuration file further includes identification information of the at least one operation interface of the first application, and the processor is further configured to receive first identification information sent by the first application and determine that the first identification information is the identification information of the first operation interface according to identification information of the at least one operation interface of the first application.

In some embodiments, the memory is configured to store a configuration file of the first application. The first application has at least one operation interface including the first operation interface. The configuration file includes identification information of each operation interface, and a correspondence between identification information of at least one control on each operation interface and at least one corresponding control instruction. The processor is configured to search for the identification information of the first control corresponding to the first control instruction from the database according to identification information of the first operation interface, the first control instruction and a correspondence between identification information of at least one control on each operation interface and at least one corresponding control instruction.

In a third aspect, a non-transitory computer-readable storage medium is provided. The non-transitory computer-readable storage medium stores executable instructions that, when executed by a terminal, cause the terminal to perform the above method of controlling applications in the terminal.

BRIEF DESCRIPTION OF THE DRAWINGS

In order to describe technical solutions in embodiments of the present disclosure more clearly, the accompanying drawings to be used in the description of disclosure will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in embodiments of the present disclosure will be described clearly and completely with reference to the accompanying drawings in the embodiments of the present disclosure. Obviously, the described embodiments are merely some but not all of the embodiments of the present disclosure. All other embodiments made on the basis of the embodiments of the present disclosure by a person of ordinary skill in the art without paying any creative effort shall be included in the protection scope of the present disclosure.

Unless otherwise defined, technical terms or scientific terms used in the embodiments of the present disclosure shall be understood as ordinary meanings by a person of ordinary skill in the field that the present disclosure belongs to. Terms "first", "second" and the like used in the embodiments of the present disclosure are not intended to mean any order, quantity or importance, and are merely used to distinguish different components. Words "include" or "comprise" and the like are intended to mean that an element or object that precedes the words includes an element or object listed after the words and equivalents thereof, and do not exclude other elements or objects. Words "connected" or "connection" and the like are not limited to physical or mechanical connections, but include electrical connections, whether direct or indirect.

In this text, a display interface refers to an interface that may be displayed on a screen of a terminal, and an operation interface refers to a display interface including at least one control.

In the related art, taking an example in which the terminal is a mobile phone, a large number of third-party applications (APPs) are usually installed in the mobile phone, and these third-party APPs are usually controlled based on touch operations. For example, if a response of a control on an operation interface of an application installed in the mobile phone needs to be activated, the application is started first to enter the operation interface of the application. Then an icon of the control displayed on the display screen is touched or clicked by using a mouse, to trigger the response of the control. However, controlling the application by touch or mouse clicks has certain limitations.

With regard to the above problem, some embodiments of the present disclosure provide a method of controlling applications in a terminal. The terminal is, for example, a mobile phone, a computer, a laptop, or a portable device (PAD). An operating system supported by the terminal is, for example, an iOS operating system or an Android operating system. The following embodiments of the present disclosure are illustrated by taking an example in which the operating system supported by the terminal is the Android operating system.

The applications are, for example, installed in the terminal. The applications include, for example, applications that come with the terminal when the terminal leaves a factory, and/or applications that are downloaded and installed in the terminal later according to the user's own requirements. The applications are, for example, calendars, browsers and WeChat. Installation packages for Android-based applications are referred to as Android packages (APKs).

Figure 1:
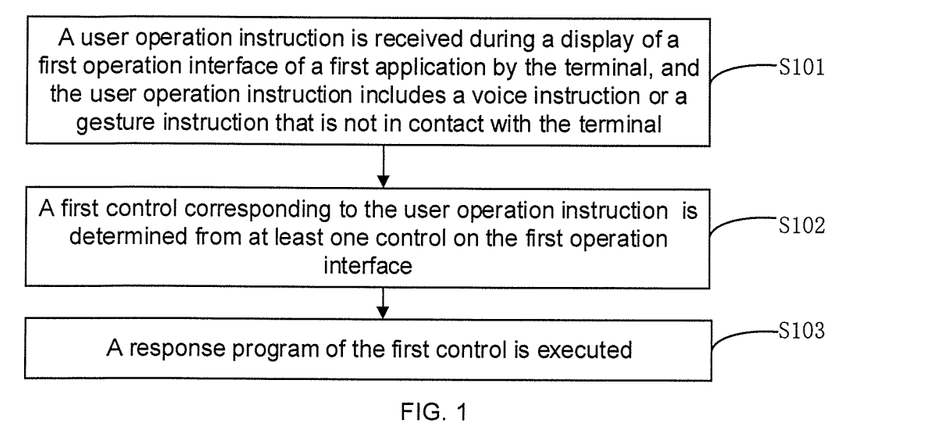
FIG. 1 is a flow diagram of a method of controlling applications in a terminal, in accordance with some embodiments.

The method is performed, for example, by a device that controls the applications, such as the terminal, or hardware and/or software included in the terminal. As shown in FIG. 1, the method includes S101 to S103.

In S101, a user operation instruction is received during a display of a first operation interface of a first application by the terminal. The user operation instruction includes a voice instruction or a gesture instruction that is not in contact with the terminal.

The first application is any application installed in and running on the terminal. Each application has at least one operation interface. The first operation interface is any operation interface of the first application.

In some embodiments, the user operation instruction is a voice instruction. In some examples, a microphone in the terminal is used for acquiring the voice instruction. For example, in response to pressing a key for voice acquisition on the terminal by the user, a module in the terminal sends an instruction to the microphone. In response to receiving the instruction, the microphone acquires a voice instruction issued by the user during the pressing (usually a long press, i.e., the press starts before the voice instruction is issued and ends after the voice instruction is issued). The key for voice acquisition is, for example, a physical key on the terminal, or a virtual key (an icon on the screen), such as a main menu key (or referred to as a menu key).

The above method is applicable, for example, to each application installed in the terminal. In this case, the key for voice acquisition is independent of the applications (i.e., the key for voice acquisition does not belong to the first application), thereby eliminating a need to separately provide the key for voice acquisition for each application.

In some other embodiments, the user operation instruction is a gesture instruction that is not in contact with the terminal, such as the screen of the terminal. In some examples, a camera in the terminal is used for capturing the gesture instruction. Of course, an identification is usually performed after the gesture instruction is received. The identification method is not limited, which may refer to the existing method.

In S102, a first control corresponding to the user operation instruction is determined from at least one control on the first operation interface.

In the related art, the first application has one or more codes for achieving the function of selecting the first control by touching the screen or by the mouse clicks. In some embodiments of the present disclosure, the codes in the first application are changed such that the codes are used to achieve the function of selecting the first control through the voice instruction or the gesture instruction that is not in contact with the terminal. That is, the first application determines the first control corresponding to the user operation instruction from the at least one control on the first operation interface according to the user operation instruction.

In some other embodiments, the S102 is performed by one or more applications other than the first application in the applications installed in the terminal to determine the first control. Thus, there is no need to re-develop the first application, thereby saving time and economic costs.

In some embodiments, in order to accurately determine the first control corresponding to the user operation instruction from the at least one control on the first operation interface, the method further includes: determining whether the first application belongs to a preset set of applications, and performing the above S102 if the first application belongs to the preset set of applications. The preset set of applications are applications that can be controlled by the user operation instruction. That is, before the application is controlled by the user operation instruction (for example, a voice instruction), it is first determined whether the application is able to be controlled by the user operation instruction.

In some examples, the set of applications is a set of applications having the configuration files that are stored in the database. In this case, determining whether the first application belongs to a preset set of applications, includes determining whether the Activity name of the first operation interface of the first application is stored in the database according to the package names of the applications and the Activity names of the operation interfaces in the configuration files. That is, it is determined whether the Activity name of the first operation interface currently displayed is stored in the database, and based on the result, whether the first operation interface currently displayed may be controlled by the user operation instruction may be determined.

In S103, a response program of the first control is executed.

In some embodiments, the user operation command issued by the user is a voice instruction, which is "searching for Andy Lau". In some examples, the microphone in the terminal receives the voice instruction, and then a first control corresponding to the voice instruction, i.e., a "search" control, is determined from the at least one control on the first operation interface. Then a response program of the search control, i.e., a search operation, is executed, that is, the terminal starts to search for Andy Lau.

In the method provided by the embodiments of the present disclosure, after entering the first operation interface of the first application, the terminal receives at least one non-contact operation instruction from the user (for example, the voice instruction or the gesture instruction), and determines the first control corresponding to the user operation instruction from the at least one control on the first operation interface in response to the operation instruction, and then triggers the response program of the first control. In this way, a control of the applications may be achieved, thereby extending a method of using the applications.

The method of controlling applications in the terminal will be illustrated by taking an example in which a control of the first application by the voice instruction or the gesture instruction is achieved by using the application other than the first application in the applications installed in the terminal below.

In addition, the following will be illustrated by taking an example in which the operating system of the terminal is the Android operating system. Of course, the following method is also applicable to other operating systems.

According to a logical structure, the Android operating system is divided into, for example, applications at the top layer, an application framework layer, and a hardware abstraction layer (HAL), etc. The applications at the top layer and the application framework layer in Android architecture of the terminal provided by some embodiments are described in detail with reference to FIG. 5.

Figure 5:
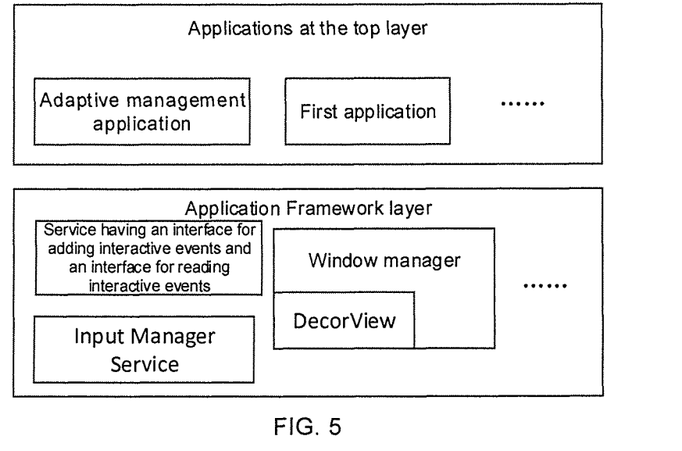
FIG. 5 is a schematic diagram showing a partial logical structure of an operating system, in accordance with some embodiments.

In some examples, the applications at the top layer include applications (e.g., one or more APPs that come with the terminal when the terminal leaves the factory, or one or more APPs that are downloaded and installed after the terminal leaves the factory, e.g., one or more third-party APPs) that may be controlled by the user operation instruction (e.g., the voice instruction or the gesture instruction), and the applications include the first application. The applications at the top layer, for example, further include an adapter for managing applications (which may be referred to as an adaptive management APP or an adaptive management APK, and is referred to as an adaptive management application hereinafter). The adaptive management application is, for example, an application that comes with the terminal when the terminal leaves the factory, or an application that is downloaded and installed after the terminal leaves the factory. The adaptive management application is configured to obtain identification information of the first control corresponding to the user operation instruction according to the user operation instruction.

As shown in FIG. 5, the application framework layer includes, for example, a Service having an interface for adding interactive events and an interface for reading interactive events, a DecorView and an Input Manager Service.

In some examples, the Service is added in the system source code SystemService.java. The interface for adding interactive events in the Service is configured to store the identification information of the first control and information related to the first control into a predetermined storage space (for example, a predetermined storage space of the framework layer), and the information stored in the predetermined storage space described above may be called by the DecorView. The interface for reading interactive events is configured to read the identification information of the first control and the information related to the first control from the predetermined storage space.

In some examples, the Input Manager Service is configured to simulate a key event. For example, the Input Manager Service is configured to send a key value to the terminal after the interface for adding interactive events stores the identification information of the first control and the information related to the first control into the predetermined storage space.

The DecorView is configured to determine if the received key value is the preset key value and call the interface for reading interactive events after determining that the received key value is the preset key value. For example, one or more codes that handle the logic of the preset key value are added into the DecorView in the system source code PhoneWindow.java to achieve functions thereof.

Figure 2:
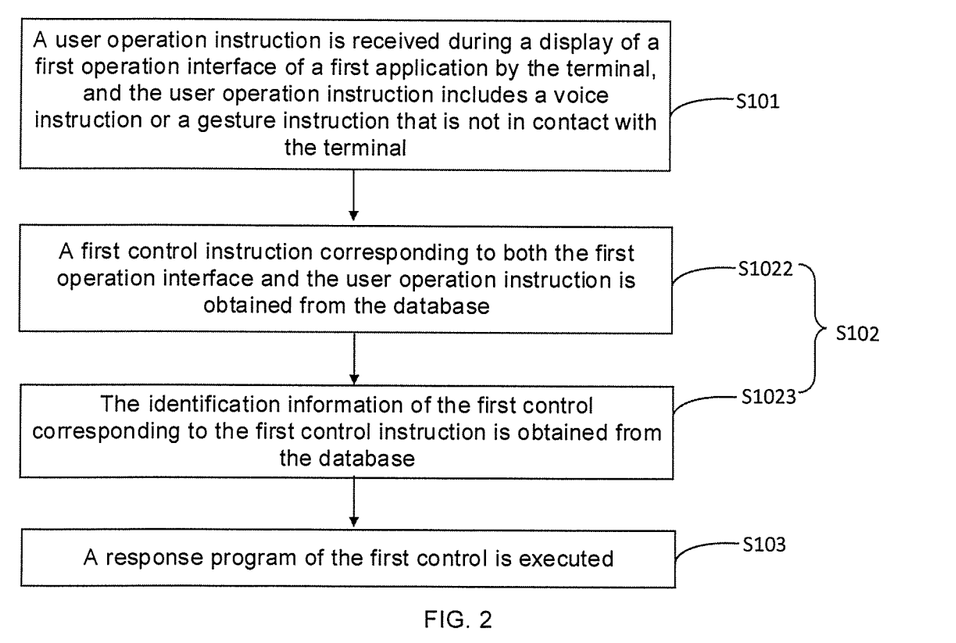
FIG. 2 is another flow diagram of a method of controlling applications in a terminal, in accordance with some embodiments.

Taking the Android architecture of the above terminal as an example, with reference to FIG. 2, the above S102, in which a first control corresponding to the user operation instruction is determined from at least one control on the first operation interface, includes S1022 to S1023. It will be noted that the following steps are also applicable to other system architectures.

In S1022, a first control instruction corresponding to both the first operation interface and the user operation instruction is obtained from the database.

This step is performed, for example, by the adaptive management application in the terminal.

In some embodiments, the above database stores a configuration file of the first application. The first application has at least one operation interface, each of which corresponds to at least one control instruction. The at least one operation interface includes the first operation interface, and at least one control instruction corresponding to the first operation interface includes the first control instruction. The configuration file includes a correspondence between identification information of each operation interface and at least one corresponding control instruction.

In the configuration file described above, identification information of an operation interface refers to information that uniquely identifies the operation interface, such as an Activity (for example, an Activity component in the Android system) name of the operation interface. In addition, the above configuration file further includes other related information, such as a package name of the first application.

Based on the above content, in some embodiments, S1022, in which a first control instruction corresponding to both the first operation interface and the user operation instruction is obtained from the database, includes S10221 to S10223.

In S10221, a control instruction corresponding to the user operation instruction is obtained from the database according to the user operation instruction.

In some examples, the user operation instruction is the voice instruction. The voice instruction received by the terminal is a voice signal, and the terminal identifies the voice signal by, for example, voice and/or semantics. The terminal searches, in the database, for a control instruction (i.e., an instruction that the terminal "knows"), voice and/or semantics of which are the same as the voice and/or the semantics of the voice signal.

For example, the database stores a plurality of control instructions such as "search", "entry", "selection", "playing", "pause", "exit", "previous", "next" and "sending". During the display of the first operation interface (such as a browser page) by the terminal, the terminal receives the voice instruction "please search for Andy Lau" issued by the user. The adaptive management application identifies the voice instruction as "please search for Andy Lau" according to a voice identification and a semantic identification, and determines, according to the "search" in the identified voice instruction, that a control instruction corresponding to the identified voice instruction is a "search" instruction.

In some other examples, the user operation instruction is the gesture instruction that is not in contact with the terminal. The gesture instruction is, for example, "a finger moving from left to right", "the finger moving from right to left", "a plurality of fingers contracting from an outside to an inside" and "the plurality of fingers expanding from the inside to the outside". Control instructions corresponding to the gesture instructions are "previous", "next", "contraction" and "expansion", respectively. The camera in the terminal acquires a gesture instruction, and the adaptive management application searches for the control instruction corresponding to the gesture instruction in the database.

For example, the database stores control instructions such as "previous", "next", "contraction" and "expansion". During the display of the first operation interface (such as the browser page) by the terminal, the terminal receives the gesture instruction that the finger moves from left to right issued by the user. The adaptive management application identifies the gesture instruction as "the finger moving from left to right" and determines that the control instruction corresponding to the gesture instruction is "previous" according to the correspondence between the identified gesture instruction and the control instruction.

In S10222, according to the identification information of the first operation interface and the correspondence between the identification information of each operation interface and the at least one corresponding control instruction, at least one control instruction corresponding to the identification information of the first operation interface is determined.

In some embodiments, the configuration file of the first application further includes identification information of the at least one operation interface of the first application. In this case, before the S10222, the method further includes: receiving, by the adaptive management application, first identification information sent by the first application, and determining, by the adaptive management application, that the first identification information is the identification information of the first operation interface according to the identification information of the at least one operation interface of the first application.

In some examples, the adaptive management application receives the first identification information sent by the first application (e.g., an Activity name of a certain operation interface in the first application). The adaptive management application determines that the Activity name of the operation interface is the Activity name of the first operation interface, that is, the adaptive management application determines the operation interface as the first operation interface according to the identification information of the at least one operation interface of the first application included in the configuration file.

In S10223, it is determined whether the control instruction corresponding to the user operation instruction is included in the at least one control instruction. If the control instruction is included in the at least one control instruction, the control instruction is determined to be the first control instruction corresponding to both the first operation interface and the user operation instruction, and if the control instruction is not included in the at least one control instruction, it is indicated that the first control instruction is not searched, and a message is sent to cause the user to re-input the user operation instruction.

In some examples, the at least one control instruction corresponding to the identification information of the first operation interface includes a "search" instruction and a "pause" instruction, and the control instruction corresponding to the user operation instruction is the "search" instruction. The adaptive management application determines whether the "search" instruction is included in the at least one control instruction. If the "search" instruction is included in the at least one control instruction, it is determined that the "search" instruction is the first control instruction corresponding to the first operation interface. That is, the first control instruction is the "search" instruction.

In some examples, the at least one control instruction corresponding to the identification information of the first operation interface includes the "search" instruction and the "pause" instruction, and the control instruction corresponding to the user operation instruction is an "exit" instruction. The adaptive management application determines whether the "exit" instruction is included in the at least one control instruction. If the "exit" instruction is not included in the at least one control instruction, it is indicated that the "exit" instruction is not searched, and the reminder to re-input the user operation instruction is issued.

In S1023, identification information of the first control corresponding to the first control instruction is obtained from the database.

In some examples, identification information of a control includes information that uniquely identifies the control, such as a control ID and a control type. The identification information of the control also includes an associated control ID and an associated control type.

In some embodiments, the first control described above refers to a control on the first operation interface for achieving the function indicated by the first control instruction. In some examples, after determining that the first control instruction is the "search" instruction through the S1022, identification information of a control for achieving a search function corresponding to the "search" instruction is obtained from the database through the S1023.

In some embodiments, the S1023 includes: searching for, by the adaptive management application, the identification information of the first control corresponding to the first control instruction from the database, according to the identification information of the first operation interface, the first control instruction, and the correspondence between identification information of the at least one control on each operation interface and at least one corresponding control instruction.

In some embodiments, the at least one control instruction corresponding to the first operation interface is in one-to-one correspondence with the identification information of the at least one control on the first operation interface. In some examples, after determining that the first control instruction is the "search" instruction, according to a correspondence between the "search" instruction and identification information of a search control on the first operation interface, the adaptive management application searches for the identification information of the search control from the database.

In some embodiments, after the identification information of the first control corresponding to the first control instruction is searched, the method further includes: transmitting, by the adaptive management application, the identification information of the first control to the framework layer of the terminal, so that the framework layer obtains the identification information of the first control.

In the related art, in order to execute the response program of the first control, it is also required that the framework layer first obtains the identification information of the first control. Therefore, the above embodiments are applicable to the original first application, thereby eliminating a need to change the codes of the original first application itself, thereby avoiding disadvantages due to a development of the applications.

Based on an open source and a deep customizability of the Android operating system, in the embodiments of the present disclosure, based on an original Android operating system, the above Service having the interface for adding interactive events and the interface for reading interactive events is added, and corresponding changes are made to the Input Manager Service and the DecorView to achieve the respective functions described above.

In some embodiments, the step of transmitting, by the adaptive management application, the identification information of the first control to the framework layer of the terminal is cooperatively completed by the Service having the interface for adding interactive events and the interface for reading interactive events, DecorView and Input Manager Service. That is, the step of transmitting, by the adaptive management application, the identification information of the first control to the framework layer of the terminal, so that the framework layer obtains the identification information of the first control, includes: calling, by the adaptive management application, the interface for adding interactive events to store the identification information of the first control; sending, by the Input Manager Service, a specific key value to the terminal; and calling, by the DecorView, the interface for reading interactive events to read the identification information of the first control after determining that the specific key value is received.

In some examples, the adaptive management application includes one or more codes. When the one or more codes are executed, the interface for adding interactive events in the Service may be called to store the identification information of the first control. In some examples, the interface for adding interactive events in the Service stores the identification information of the first control and the information related thereto into the predetermined storage space, and at the same time, an InjectInputEvent interface in the Input Manager Service is called to simulate the key event. That is, the key value is sent to a key event processing portion in the framework layer. The key event processing portion in the framework layer will search for a current active window after receiving the key value. An InputChanel of the current active window sends the key value to a process of the first application. The process of the first application is, for example, a window management portion of the first application (also referred to as a window manager).

After receiving the key value, executing the codes in the DecorView may determine whether the key value received is the preset key value, and the interface for reading interactive events in the Service is called to read the identification information of the first control after the key value is determined to be the preset key value.

Thus, since the applications each may be controlled by the voice instruction or the gesture instruction without a need to re-develop the applications, labor and time costs are saved. Moreover, since there is no need to modify the applications themselves, a disadvantage of working with third-party companies is avoided.

The following is illustrated by taking an example in which the user operation instruction is the voice instruction, that is, an entire control is a voice control.

In some embodiments, a program for executing the step of obtaining the identification information of the first control corresponding to the first control instruction from the database in the above S1023 is installed in a remote server. In some other embodiments, the program for executing the above S1023 is installed in the terminal. Thus, the remote server does not need to install related simulators to control the applications installed in the terminal and return identification information of related controls to the terminal, thereby reducing a network overhead and server resources required between the terminal and the server, and reducing a network delay. The following embodiments are all illustrated by taking an example in which the program for executing the above S1022 is installed in the terminal.

Figure 3:
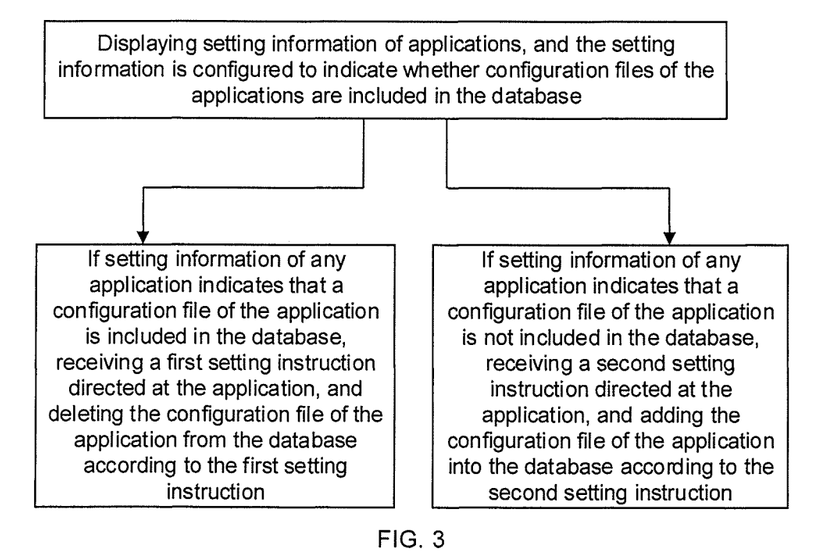
FIG. 3 is a partial flow diagram of a method of controlling applications in a terminal, in accordance with some embodiments.

As shown in FIG. 3, in some embodiments, the method of controlling applications in a terminal further includes displaying setting information of the applications installed in the terminal. The setting information is used to indicate whether configuration files of the applications are included in the database.

In some embodiments, if setting information of any application indicates that the configuration file of the application is included in the database, a first setting instruction (also referred to as a deletion instruction) issued by the user directed at the application is received, and the configuration file of the application is deleted from the database according to the first setting instruction.

In some examples, the setting information of the above application indicates that the configuration file of the application is included in the database, which indicates that the application may be controlled by voice. However, the user does not need to frequently control the application by voice according to actual needs. For example, the user has little or almost no voice control on a certain application. In this case, the user may delete the configuration file of the application from the database through the first setting instruction, thereby releasing a certain memory footprint.

In some embodiments, if setting information of any application indicates that the configuration file of the application is not included in the database, a second setting instruction (also referred to as an add instruction) issued by the user directed at the application is received, and the configuration file of the application is added into the database according to the second setting instruction (for example, the configuration file of the application is added from the server to the database).

In some examples, applications are installed in the terminal, but the configuration files of the applications are not included in the database, which indicates that the applications cannot be controlled by voice. In this case, the user may issue the second setting instruction to the terminal to obtain public keys and signature information of the applications, thereby adding the configuration files of the applications into the database.

Figure 4:
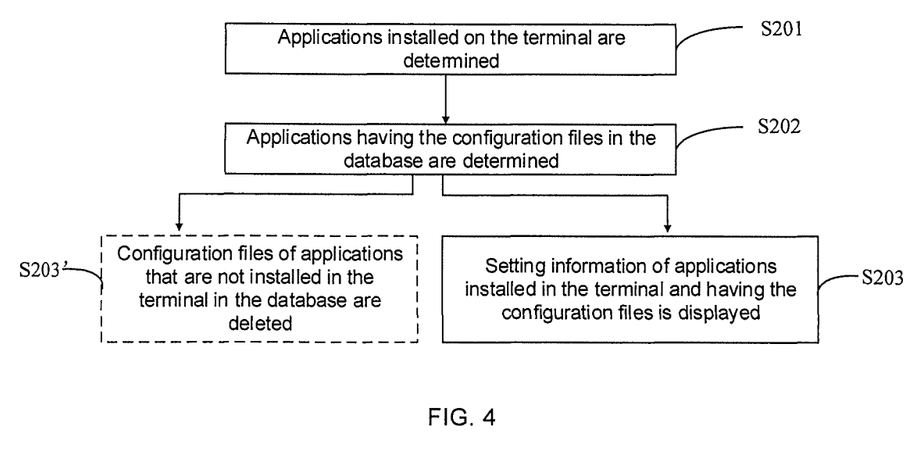
FIG. 4 is another partial flow diagram of a method of controlling applications in a terminal, in accordance with some embodiments.

In some embodiments, with reference to FIG. 4, displaying the setting information of the applications installed in the terminal, includes S201 to S203.

In S201, applications installed in the terminal are determined.

In S202, applications having the configuration files stored in the database are determined.

In S203, setting information of applications installed in the terminal and having the configuration files is displayed according to the applications installed in the terminal and the applications having the configuration files stored in the database.

In some embodiments, in order to reduce unnecessary memory footprint in the terminal, as shown in FIG. 4, the method of controlling applications in a terminal further includes S203'.

In S203', configuration files of applications that are not installed in the terminal are deleted from the database.

In some embodiments, when the above S203' is performed, it is necessarily determined that the applications have been installed in the terminal (i.e., the above S201), and the applications having the configuration files stored in the database have been determined (i.e., the above S202). With regard to the S203' and the S203 themselves, there is no sequential or dependent relationship between the two steps. That is, the two steps are independent steps based on the S201 and the S202.

In some embodiments, in a case where applications are not installed in the terminal, but configuration files of the applications are stored in the database, the memory is released by deleting the configuration files of the applications that are not installed in the terminal from the database.

A process of deleting the configuration files of the applications from the database or adding the configuration files of the applications into the database is managed and controlled by the adaptive management application described above, and a display (for example, a display of the setting information) process is performed by a display of the terminal.

The method will be further illustrated by taking the voice "searching for Andy Lau" as an example and with reference to the above method of controlling applications in a terminal below.

During the display of the first operation interface of the first application by the terminal, when the terminal receives the user operation instruction "searching for Andy Lau", the adaptive management application performs a voice analysis and/or a semantic analysis on the user operation instruction, to analyze an intention and an object entity of the user operation instruction. The voice analysis and the semantic analysis are performed in a manner commonly used in the related art, which is not limited herein.

Moreover, the adaptive management application determines whether the first operation interface currently displayed is a voice control interface (a determination method refers to the above embodiment). In some examples, the first operation interface (i.e., an operation interface of a currently running application) is the voice control interface. That is, a configuration file of the application is included in the database (e.g., the identification information of the operation interface and the correspondence between the identification information of the at least one control on the operation interface and the at least one corresponding control instruction are included). When the first operation interface is the voice control interface, a control instruction corresponding to the above voice operation instruction is determined according to the configuration file, and identification information of a control corresponding to the control instruction is determined. The identification information of the control is as follows:

| Instruction Description | Control ID | Control Type | Association ID | Association Type |
|---|---|---|---|---|
| Search | 2130771985 | button | 2130771984 | edittext |

After the adaptive management application obtains the identification information of the control corresponding to the control instruction (e.g., the information shown above), the adaptive management application will call the interface for adding interactive events of the Service to store the identification information of the control, and the InputManagerService will send a key value. After the DecorView receives the key value, the codes in DecorView is executed, which may determine whether the key value received is a preset key value. If the key value is the preset key value, it is determined that the preset key value is received, and the interface for reading interactive events is called to read the identification information of the control. For example, contents of the user operation instruction that are related to the control ID and the association ID are read, and the content of the association ID is specified as "Andy Lau" (the association type of the association ID is a text box in this case). After the content of the association ID is set to be "Andy Lau", a response is performed through a processing interface corresponding to the control (i.e., a corresponding "search" button is triggered), thereby completing a voice control.

Figure 6:
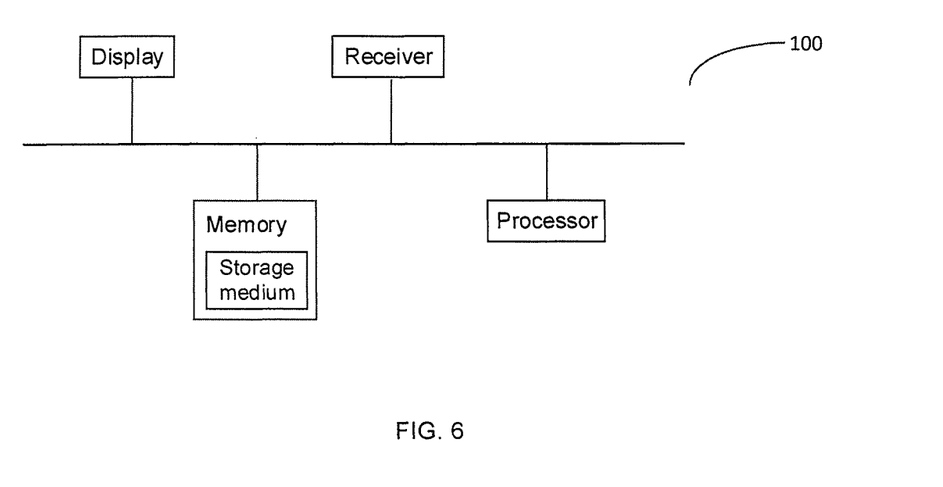
FIG. 6 is a schematic diagram of a terminal, in accordance with some embodiments.

As shown in FIG. 6, some embodiments of the present disclosure provide a terminal 100, which includes a display, a receiver, and a processor. The display is configured to display the first operation interface of the first application. The receiver is configured to receive the user operation instruction during the display of the first operation interface of the first application by the display. The user operation instruction includes the voice instruction or the gesture instruction that is not in contact with the terminal. The processor is configured to determine the first control corresponding to the user operation instruction from the at least one control on the first operation interface and execute the response program of the first control.

In some embodiments, the user operation instruction is the voice instruction. In this case, the receiver is, for example, a microphone that receives a voice operation instruction.

In some other embodiments, the user operation instruction is the gesture instruction that is not in contact with the terminal. In this case, the receiver is, for example, a camera that receives a gesture operation instruction of the user.

In some embodiments, the above processor is, for example, a central processing unit (CPU), a general-purpose processor, a digital signal processor (DSP), an application-specific integrated circuit (ASIC), a field programmable gate array (FPGA) or other programmable logic devices, a transistor logic device, a hardware component, or any combination thereof. An implementation or an execution of the above processor is combined with various exemplary logical blocks, modules and circuits described in the present disclosure. In some other embodiments, the above processor is, for example, a combination for achieving computing functions, such as a combination including one or more microprocessors and a combination of a DSP and a microprocessor.

Compared with the related art, the terminal in the embodiments of the present disclosure does not need the finger or the mouse to directly act on the icon of the first control, but after entering the first operation interface of the first application, the first control corresponding to the user operation instruction is searched from the at least one control on the first operation interface through the non-contact voice instruction or gesture instruction, and then the response program of the first control is triggered, thereby achieving the control of the applications and extending the method of using the applications.

On this basis, in order to avoid a redevelopment of a single application, in some embodiments of the present disclosure, the application is controlled by the voice instruction or the gesture instruction without changing the code of the application itself. In this case, the above processor is configured as follows.

In some embodiments, the processor is configured to obtain the first control instruction corresponding to both the first operation interface and the user operation instruction from the database, and obtain the identification information of the first control corresponding to the first control instruction from the database.

The above database stores the configuration file of the first application. The first application has at least one operating interface including the first operation interface. The configuration file includes the correspondence between the identification information of each operation interface and at least one corresponding control instruction. The at least one corresponding control instruction of the first operation interface includes the first control instruction.

An operating system is installed on the terminal, and the operating system being the Android system (including the applications at the top layer and the application framework layer) is taken as an example. In some examples, the applications at the top layer include applications that can be controlled by the user operation instruction (such as the voice instruction or the gesture instruction), and the adaptive management application. The processor searches for the identification information of the first control corresponding to the first control instruction according to the correspondence, and transmits the identification information of the first control to the framework layer of the terminal, so that the framework layer obtains the identification information of the first control.

In some examples, a cooperative completion by the terminal, the Service having the interface for adding interactive events and the interface for reading interactive events, the DecorView and the InputManagerService includes: calling the interface for adding interactive events of the Service through the adaptive management application to store the identification information of the first control, and sending the specific key value through the Input Manager Service, and calling the interface for reading interactive events of the Service to read the identification information of the first control after determining that the DecorView receives the specific key value.

Of course, related explanations in the terminal may refer to a portion corresponding to the above method of controlling applications in a terminal in the embodiments. With regard to other related settings in the terminal, corresponding programs may be set in combination with and with reference to the portion corresponding to the above method of controlling applications in a terminal in the embodiments, and details are not described herein again.

Some embodiments of the present disclosure provide a non-transitory computer-readable storage medium storing executable instructions that, when executed by a terminal, cause the terminal to perform the above method of controlling applications in the terminal.

The non-transitory computer-readable storage medium is, for example, any available media that may be accessed by a computer, or a data storage device such as a server or a data center including a single available medium or an integration of a plurality of available media. The available medium is, for example, a magnetic medium (for example, a floppy disk, a hard disk, a magnetic tape), an optical medium (for example, a digital video disc (DVD)), or a semiconductor medium (for example, a solid state disk (SSD)).

Some embodiments of the present disclosure provide a computer program product including instructions for causing the terminal to perform the above method of controlling applications in a terminal when the computer program product is run on a terminal.

In some examples, the computer program product described above includes one or more computer instructions. In addition, a person of ordinary skill in the art may understand that: all or part of the steps in the method embodiments described above may be implemented by using a program to control related hardware to perform the steps. The above program may be stored in the non-transitory computer-readable storage medium for executing the steps included in the method embodiments above. The foregoing storage medium includes various media that may store program codes, such as a read-only memory (ROM), a random-access memory (RAM), a magnetic disk, or an optical disk.

The foregoing descriptions are merely some implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A method of controlling applications in a terminal, the method comprising:
    receiving a user operation instruction during a display of a first operation interface of a first application by the terminal, wherein the user operation instruction includes a voice instruction or a gesture instruction that is not in contact with the terminal;
    determining a first control corresponding to the user operation instruction from at least one control on the first operation interface, which includes:
        obtaining a first control instruction corresponding to both the first operation interface and the user operation instruction from a database; and
        obtaining identification information of the first control corresponding to the first control instruction from the database;
    executing a response program of the first control;

wherein, the method further comprising:
displaying setting information of applications installed in the terminal, wherein the setting information is used to indicate whether configuration files of the applications are included in the database, wherein,
if setting information of any application indicates that a configuration file of the application is included in the database, receiving a first setting instruction directed at the application, and deleting the configuration file of the application from the database according to the first setting instruction; and
if setting information of any application indicates that a configuration file of the application is not included in the database, receiving a second setting instruction directed at the application, and adding the configuration file of the application into the database according to the second setting instruction.

2. The method of controlling applications in the terminal according to claim 1, wherein the first application has at least one operation interface including the first operation interface, the database stores a configuration file of the first application, and the configuration file includes a correspondence between identification information of each operation interface and at least one corresponding control instruction, wherein at least one corresponding control instruction of the first operation interface includes the first control instruction; and
obtaining the first control instruction corresponding to both the first operation interface and the user operation instruction from the database, includes:
obtaining a control instruction corresponding to the user operation instruction from the database according to the user operation instruction;
determining, according to identification information of the first operation interface and the correspondence between the identification information of each operation interface and the at least one corresponding control instruction, at least one control instruction corresponding to the identification information of the first operation interface;
determining whether the control instruction corresponding to the user operation instruction is included in the at least one control instruction;
determining the control instruction to be the first control instruction corresponding to both the first operation interface and the user operation instruction if the control instruction is included in the at least one control instruction; and
sending a message to cause a user to re-input the user operation instruction if the control instruction is not included in the at least one control instruction.

3. The method of controlling applications in the terminal according to claim 2, wherein the configuration file further includes identification information of the at least one operation interface of the first application, and before determining, according to the identification information of the first operation interface and the correspondence between the identification information of each operation interface and the at least one corresponding control instruction, at least one control instruction corresponding to the identification information of the first operation interface, the method further comprises:
receiving, by using an adaptive management application, first identification information sent by the first application; and
determining, by using an adaptive management application, that the first identification information is the identification information of the first operation interface according to the identification information of the at least one operation interface of the first application.

4. The method of controlling applications in the terminal according to claim 1, wherein the database stores a configuration file of the first application, the first application has at least one operation interface including the first operation interface, and the configuration file includes identification information of each operation interface, and a correspondence between identification information of at least one control on each operation interface and at least one corresponding control instruction; and
obtaining the identification information of the first control corresponding to the first control instruction from the database, includes:
searching, by using an adaptive management application, for the identification information of the first control corresponding to the first control instruction from the database, according to identification information of the first operation interface, the first control instruction, and the correspondence between the identification information of the at least one control on each operation interface and the at least one corresponding control instruction.

5. The method of controlling applications in the terminal according to claim 4, wherein after the identification information of the first control corresponding to the first control instruction is searched, the method further comprises:
transmitting, by using the adaptive management application, the identification information of the first control to a framework layer of the terminal, so that the framework layer obtains the identification information of the first control.

6. The method of controlling applications in the terminal according to claim 5, wherein the framework layer includes a Service having an interface for adding interactive events and an interface for reading interactive events, an Input Manager Service and a DecorView; and
transmitting, by using the adaptive management application, the identification information of the first control to the framework layer of the terminal, so that the framework layer obtains the identification information of the first control, includes:
calling, by using the adaptive management application, the interface for adding interactive events of the Service to store the identification information of the first control, and sending, by using the Input Manager Service, a key value; and
calling, by using the DecorView, the interface for reading interactive events of the Service to read the identification information of the first control after determining that the key value is received.

7. The method of controlling applications in the terminal according to claim 1, wherein displaying the setting information of the applications installed in the terminal, includes:
determining applications installed in the terminal;
determining applications having configuration files stored in the database; and
displaying setting information of applications installed in the terminal and having configuration files according to the applications installed in the terminal and the applications having configuration files stored in the database.

8. The method of controlling applications in the terminal according to claim 1, the method further comprising:
deleting a configuration file of at least one application that is installed in the terminal from the database.

9. The method of controlling an application in the terminal according to claim 1, the method further comprising:
    determining whether the first application belongs to a preset set of applications; and
    performing the step of determining the first control corresponding to the user operation instruction from the at least one control on the first operation interface if the first application belongs to the preset set of applications.

10. A terminal, comprising:
    a display configured to display a first operation interface of a first application and display setting information of applications installed in the terminal, wherein the setting information is used to indicate whether configuration files of the applications are included in a database;
    a receiver configured to receive a user operation instruction during a display of the first operation interface of the first application, wherein the user operation instruction includes a voice instruction or a gesture instruction that is not in contact with the terminal;
    a processor configured to determine a first control corresponding to the user operation instruction from at least one control on the first operation interface and execute a response program of the first control;
    wherein determine a first control corresponding to the user operation instruction from at least one control on the first operation interface includes:
        obtain a first control instruction corresponding to both the first operation interface and the user operation instruction from the database;
        obtain identification information of the first control corresponding to the first control instruction from the database;
    wherein if the setting information of any application indicates that a configuration file of the application is included in the database, the receiver receives a first setting instruction directed at the application, and the processor deletes the configuration file of the application from the database according to the first setting instruction; and
    wherein if the setting information of any application indicates that a configuration file of the application is not included in the database, the receiver receives a second setting instruction directed at the application, and the processor adds the configuration file of the application into the database according to the second setting instruction.

11. The terminal according to claim 10, further comprising a memory coupled to the processor, wherein
    the first application has at least one operation interface including the first operation interface, the memory is configured to store a configuration file of the first application, and the configuration file includes a correspondence between identification information of each operation interface and at least one corresponding control instruction, wherein at least one corresponding operation interface of the first operation interface includes the first control instruction; and
    the processor is configured to:
    obtain a control instruction corresponding to the user operation instruction from the database according to the user operation instruction;
    determine, according to the identification information of the first operation interface and the correspondence between the identification information of each operation interface and the at least one corresponding control instruction, at least one control instruction corresponding to the identification information of the first operation interface;
    determine whether the control instruction corresponding to the user operation instruction is included in the at least one control instruction;
    determine the control instruction to be the first control instruction corresponding to both the first operation interface and the user operation instruction if the control instruction is included in the at least one control instruction; and
    send a message to cause a user to re-input the user operation instruction if the control instruction is not included in the at least one control instruction.

12. The terminal according to claim 11, wherein the configuration file further includes identification information of the at least one operation interface of the first application, and the processor is further configured to:
    receive first identification information sent by the first application; and
    determine that the first identification information is the identification information of the first operation interface according to identification information of the at least one operation interface of the first application.

13. The terminal according to claim 10, wherein the memory is configured to store a configuration file of the first application, the first application has at least one operation interface including the first operation interface, and the configuration file includes identification information of each operation interface, and a correspondence between identification information of at least one control on each operation interface and at least one corresponding control instruction, and the processor is further configured to:
    search for the identification information of the first control corresponding to the first control instruction from the database, according to identification information of the first operation interface, the first control instruction and a correspondence between identification information of at least one control on each of the at least one operation interface and the at least one corresponding control instruction.

14. A non-transitory computer-readable storage medium storing executable instructions that, when executed by a terminal, cause the terminal to perform operations including:
    receiving a user operation instruction during a display of a first operation interface of a first application by the terminal, wherein the user operation instruction includes a voice instruction or a gesture instruction that is not in contact with the terminal;
    determining a first control corresponding to the user operation instruction from at least one control on the first operation interface, which includes:
        obtaining a first control instruction corresponding to both the first operation interface and the user operation instruction from a database; and
        obtaining identification information of the first control corresponding to the first control instruction from the database;
    executing a response program of the first control;
    displaying setting information of applications installed in the terminal, wherein the setting information is used to indicate whether configuration files of the applications are included in the database, wherein,
    if setting information of any application indicates that a configuration file of the application is included in the database, receiving a first setting instruction directed at the application, and deleting the configuration file of the application from the database according to the first setting instruction; and if setting information of any application indicates that a configuration file of the application is not included in the database, receiving a second setting instruction directed at the application, and adding the configuration file of the application into the database according to the second setting instruction.

* * * * *